US006215095B1

(12) United States Patent
Partanen et al.

(10) Patent No.: US 6,215,095 B1
(45) Date of Patent: Apr. 10, 2001

(54) APPARATUS AND METHOD FOR CONTROLLING EXPOSURE OF A SOLIDIFIABLE MEDIUM USING A PULSED RADIATION SOURCE IN BUILDING A THREE-DIMENSIONAL OBJECT USING STEREOLITHOGRAPHY

(75) Inventors: Jouni P. Partanen, Los Angeles; Dennis R. Smalley, Newhall, both of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/313,938

(22) Filed: May 18, 1999

Related U.S. Application Data (63) Continuation of application No. 08/847,855, filed on Apr. 28, 1997, now Pat. No. 6,001,297.

(51) Int. Cl.[7] .......................... B23K 26/00; B29C 67/00; B44B 1/02; G03C 9/08
(52) U.S. Cl. ................................ 219/121.62; 219/121.8; 264/497; 156/272.8
(58) Field of Search .......................... 219/121.6, 121.61, 219/121.62, 121.78, 121.79, 121.8, 121.81, 121.82, 121.85, 121.83; 264/401, 497, 400; 156/272.8, 273.3; 700/119, 120; 118/423, 429

(56) References Cited

U.S. PATENT DOCUMENTS

| | | | |
|---|---|---|---|
| 4,938,816 | * | 7/1990 | Beaman et al. ............... 156/272.8 X |
| 4,983,419 | | 1/1991 | Henkel et al. . |

(List continued on next page.)

FOREIGN PATENT DOCUMENTS

| | | |
|---|---|---|
| 0050010 A2 | 4/1982 | (EP) . |
| 0393677 A2 | 10/1990 | (EP) . |
| 0484182 A1 | 5/1992 | (EP) . |
| 1-228828 * | 9/1989 | (JP) . |
| 2-111528 * | 4/1990 | (JP) . |
| 2-95830 * | 4/1990 | (JP) . |
| 6-143437 | 5/1994 | (JP) . |
| WO 95/29053 | 2/1995 | (WO) . |

OTHER PUBLICATIONS

Alan J. Herbert, "Solid Object Generation," Journal of Applied Photographic engineering, vol. 8, No. 4, Aug. 1982, pp. 185–188.

Partanen, J., "Lasers and Optics in Stereolithography," SPIE—The International Society for Optical Engineering. vol. 2703 (Jan. 29–Feb. 2, 1996), pp. 502–511.

*Primary Examiner*—Samuel M. Heinrich
(74) *Attorney, Agent, or Firm*—Ralph D'Alessandro (57) ABSTRACT

Methods and apparatus for forming three-dimensional objects from a medium solidifiable when subjected to a beam of pulsed radiation wherein the pulses of radiation are made to occur when the beam is directed to desired pulsing locations on a target surface of the medium. Preferred embodiments of the instant invention include a pulsed laser assembly, including a laser and a pulse generation circuit, a control computer, a plurality of mirrors and mirror encoders. The computer controls the movement of the mirrors which guide the laser beam across the surface of the solidifiable medium. The pulsing of the laser beam is correlated to the position of the mirrors and thus, is not dependent upon time. Pulsing linked to position of beam placement allows controlled and repeatable use of a pulsed beam for the formation of objects.

106 Claims, 5 Drawing Sheets

U.S. PATENT DOCUMENTS

| | | |
|---|---|---|
| 4,999,143 | 3/1991 | Hull et al. . |
| 5,014,207 | 5/1991 | Lawton . |
| 5,058,988 | 10/1991 | Spence . |
| 5,059,021 | 10/1991 | Spence et al. . |
| 5,104,592 | 4/1992 | Hull et al. . |
| 5,123,734 | 6/1992 | Spence et al. . |
| 5,133,987 | 7/1992 | Spence et al. . |
| 5,174,931 | 12/1992 | Almquist et al. . |
| 5,182,056 | 1/1993 | Spence et al. . |
| 5,182,715 * | 1/1993 | Vorgitch et al. ................ 264/401 X |
| 5,184,307 | 2/1993 | Hull et al. . |
| 5,192,469 | 3/1993 | Smalley et al. . |
| 5,192,559 | 3/1993 | Hull et al. . |
| 5,238,639 | 8/1993 | Vinson et al. . |
| 5,256,340 | 10/1993 | Allison et al. . |
| 5,321,622 | 6/1994 | Snead et al. . |
| 5,429,908 * | 7/1995 | Hokuf et al. ..................... 264/401 X |
| 5,495,328 | 2/1996 | Spence et al. . |
| 5,597,520 | 1/1997 | Smalley et al. . |
| 5,840,239 | 11/1998 | Partanen et al. . |
| 5,902,537 | 5/1999 | Almquist et al. . |
| 5,943,235 | 8/1999 | Earl et al. . |
| 5,999,184 | 12/1999 | Smalley et al. . |
| B1 4,575,330 | 12/1989 | Hull . |

* cited by examiner

APPARATUS AND METHOD FOR CONTROLLING EXPOSURE OF A SOLIDIFIABLE MEDIUM USING A PULSED RADIATION SOURCE IN BUILDING A THREE-DIMENSIONAL OBJECT USING STEREOLITHOGRAPHY

This is a continuation of application Ser. No. 08/847,855, filed Apr. 28, 1997, now U.S. Pat. No. 6,001,297.

FIELD OF THE INVENTION

The present invention is directed toward methods and apparatus for forming three-dimensional objects on a layer by layer basis. It is more particularly directed to methods and apparatus involving utilization of pulsed radiation sources for exposing building material when forming three-dimensional objects according to the principles of stereolithography.

BACKGROUND OF THE DISCLOSURE

In recent years, many different techniques for the fast production of three-dimensional models have been developed for industrial use, which are sometimes referred to as rapid prototyping and manufacturing ("RP&M") techniques. In general, rapid prototyping and manufacturing techniques build three-dimensional objects, layer-by-layer, from a working medium utilizing a sliced data set representing cross-sections of the object to be formed. Typically an object representation is initially provided by a Computer Aided Design (CAD) system.

Stereolithography, the presently dominant RP&M technique, may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional, layer data representing cross-sections of the object. Layers of material are successively formed and selectively transformed (i.e., cured) into successive laminae according to the two-dimensional layer data. During transformation, the successive laminae are bonded to previously formed laminae to allow integral formation of the three-dimensional object.

Figure 1:
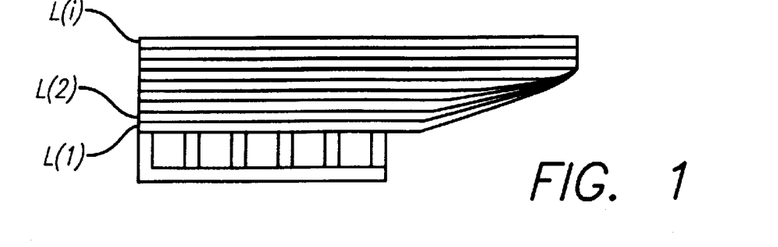
FIG. 1 depicts a side view of layers of an object distorted through material shrinkage occurring during the solidification of adjacent layers.
Figure 2A:
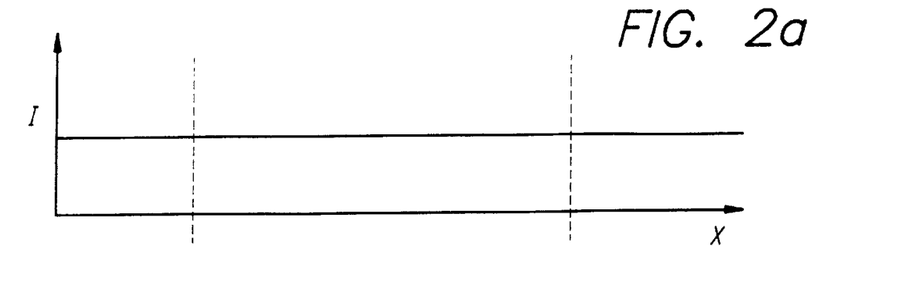
FIG. 2a depicts the relationship of the intensity of a cw laser to position along a line.
Figure 2B:
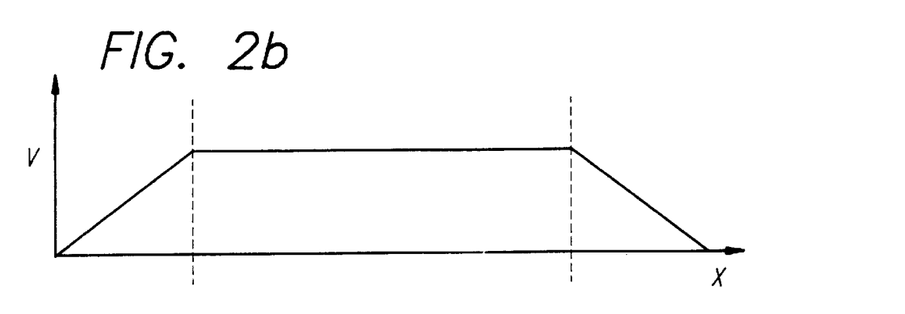
FIG. 2b depicts the velocity of a beam along a line including acceleration and deceleration phases of the beam velocity as a function of position.
Figure 2C:
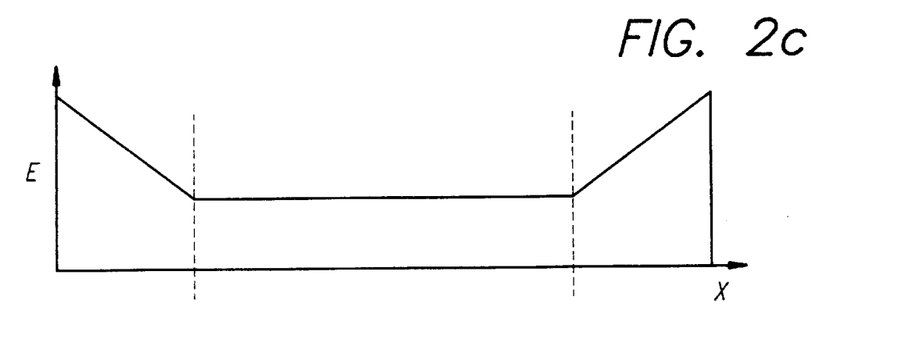
FIG. 2c depicts the resulting exposure as a function of position.
Figure 2D:
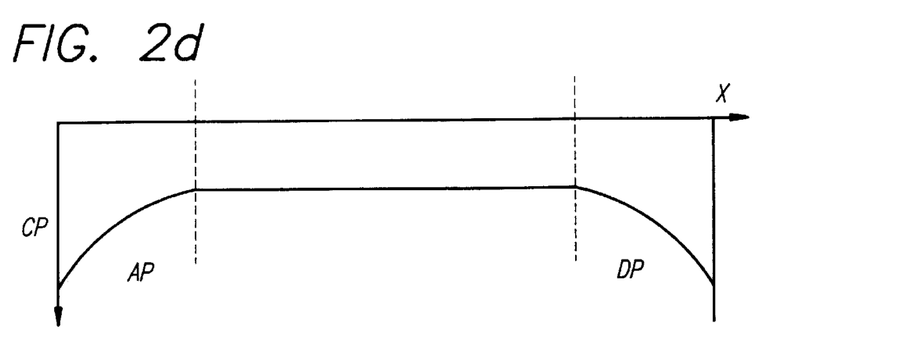
FIG. 2d is a graph depicting the cure depth of a scan line resulting from the exposure depicted in FIG. 2c.

Though, stereolithography has shown itself to be an effective technique for forming three-dimensional objects, various improvements have been desired for some time. Many improvements have been made to object accuracy over the years; however, there still remains a need for improving accuracy further. Various aspects of the stereolithographic building process can impact the accuracy of objects formed. For instance, one property of the resins currently used in this process is that the resins are prone to shrinkage during solidification. FIG. 1 illustrates this problem.

FIG. 1 depicts a series of layers, L(i), L(2) . . . L(1), solidified on top of each other. As seen in FIG. 1, the lower layers, e.g., L(1), L(2), particularly, the unsupported portions, are bent upward towards the subsequently formed layers. The bending occurs because as each of the subsequent layers solidify, the newly formed laminae shrink. As each laminae shrinks, it pulls the laminae below upward and causes distortion to the object.

Various techniques involving the utilization of certain exposure strategies have been utilized to overcome this shrinkage/distortion problem. Examples of these techniques may be found in U.S. Pat. Nos. 5,104,592 and 5,256,340. One such technique involves the use of multiple exposures in the solidification of individual laminae wherein the first exposure might not cause direct adhesion to previous lamina. In addition to the vertical application of this technique, discussed above, the technique could be applied in a horizontal application by forming spatially separated regions on a lamina followed by the complete or partial solidification of the intermediate regions during a subsequent exposure of that lamina or during exposure of a subsequent lamina.

Due to advances in solid state laser development, the stereolithographic art has recently started to turn away from the inefficient gas lasers commercially used in the past and has begun to turn to frequency-multiplied, solid-state lasers. Frequency tripling of 1049 nm–1064 nm NdNYAG, Nd/YVO$_4$, and NdNYLF lasers produces wavelengths of 355 nm (YAG and YVO$_4$), 351 nm (YLF) and 349 nm (YLF), which are all suitable for use in stereolithography with current resin formulations. Frequency quadrupling of 1342 nm Nd/YVO$_4$ lasers produces a wavelength (335 nm) which is suitable for stereolithography as well. More detail about solid-state lasers can be found in U.S. Pat. No. 5,840,235. As applied to stereolithography up to this point in time, these lasers operate in a constant-repetition, pulsed mode.

As the stereolithographic art has turned to these new lasers and benefited from their increased efficiency and longer life, building styles and exposure techniques have not yet been optimized. A need for optimizing the stereolithography process for use with pulsed laser sources exists. This particularly applies to optimizations that will allow distortion reduction techniques, like those described above, to be utilized in combination with these pulsed lasers.

Another problem encountered during the building process relates to the ability to obtain a uniform exposure of the layer of solidifiable material. Currently, in some systems, the layers are solidified by scanning a light beam in predetermined scanning lines across a surface of the liquid (e.g. the upper surface which is located at a working or target surface). Conventionally, a scanner is used consisting of two rotating mirrors deflecting the incident light beam in x- and y-directions to trace the desired object contour and to fill interior portions of the respective laminae.

Due to the velocity changes in the mirrors, some portions of the scan path may be subjected to a greater amount of radiation than other portions. This variation in applied radiation, i.e. exposure, may result in a variation in solidification depth induced in the medium. The simplified case of a single linear scanning line exemplifies this problem. To solidify the line, the scanning mirrors position the laser beam spot at the beginning of the scanning line, where the velocity of the beam spot may be zero. Thereafter, the scanning mirrors accelerate until they, and thus the beam spot, reach the desired velocity. When the end of the scanning line is reached, a deceleration of the beam spot occurs until its velocity may again be zero.

Depending upon the inertia of the scanning mirrors, the acceleration and deceleration phases might be a significant portion of the total distance moved through the scanned line. As stated above, during these phases, the laser-beam spot velocity is continuously changing. If, as in a conventional SLA, a continuously operating laser system is used, which emits a light beam of constant intensity, the exposure (defined as the product of the intensity and the effective residence time of each portion of the beam on a given unit area of the material) at each position along the scan line will change inversely in proportion to the changing beam spot velocity. Thus, in the simplified case, a nonuniform cure depth will occur in all portions of the scanning path where the velocity of the mirrors is accelerating or decelerating, e.g., at the beginning and ends of the scan path.

Unlike the simplified case of a linear line, in practice, the beam spot velocity does not necessarily reach zero at the ends of the scanning lines, rather, there may be a sudden turn in the beam spot path. Nonetheless, as in the simplified example, the adverse effects of nonuniform cure depth still may occur whenever the velocity of the mirrors change.

FIGS. 2a–2d depict an example for the simplified case. These figures depict an exemplary relationship, for a line being scanned, between the intensity, I, of the beam (FIG. 2a), the velocity, v, of the beam (FIG. 2b), the exposure level, E, (FIG. 2c), and the resulting cure profile, CP, (FIG. 2d) at each point along a line being scanned in the x-direction. The exposure which is related to the ratio of the intensity and the velocity varies as the beam spot accelerates and decelerates. In the acceleration phase, AP, the velocity of the beam spot increases as a function of time and results in the exposure of the fluid medium at a given position decreasing as a function of time. In the deceleration phase, DP, as the velocity of the beam spot decreases, the exposure of the fluid medium at a given position increases. The uneven exposure of the fluid medium depicted in FIG. 2c may result in the nonuniform cure profile shown in FIG. 2d.

U.S. Pat. No. 5,014,207 to Lawton proposes an approach to overcome this problem. This patent is hereby incorporated by reference herein as if set forth in full. In the approach proposed by Lawton, the intensity of the laser beam is modulated from a substantially zero-intensity-level to a maximum intensity level through a modulation means, such as, an acousto-optical modulator. Further, the beam spot velocity is measured and a control computer adjusts the intensity of the light beam in proportion to the measured velocity such that a constant exposure level results. This approach presents various problems. For instance, to be of optimal use it requires a real-time determination of the velocity of the beam spot such that an instantaneous modulation of the intensity can be made.

Regardless of the above technique for obtaining uniform exposure as taught in the '207 patent, a need for optimizing the uniformity of exposure in stereolithography when using pulsed laser sources still exists. Uneven exposure still exists in pulsed laser stereolithography systems. This is due, in part, to the constant pulse repetition rate of the pulsed laser as currently utilized in stereolithography systems.

Figure 3A:
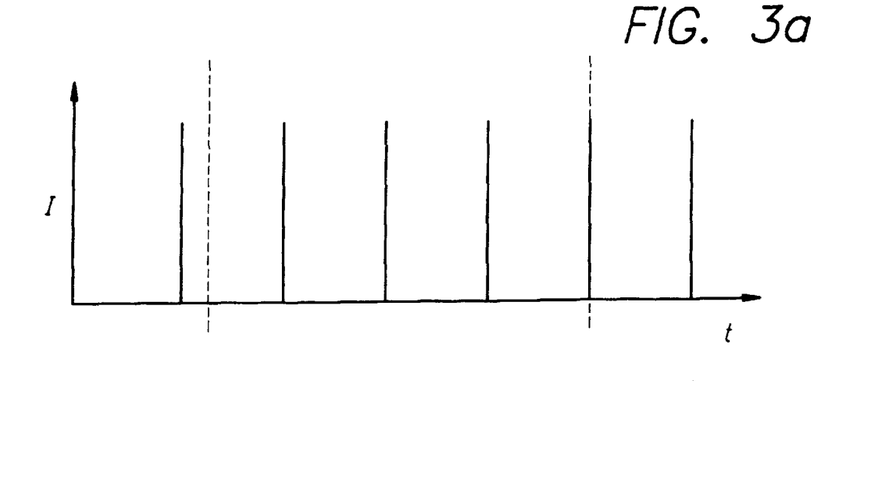
FIG. 3a is a graph depicting constant intensity laser pulses being pulsed at a constant time interval where the scanning velocity of the laser varies across the scan line.
Figure 3B:
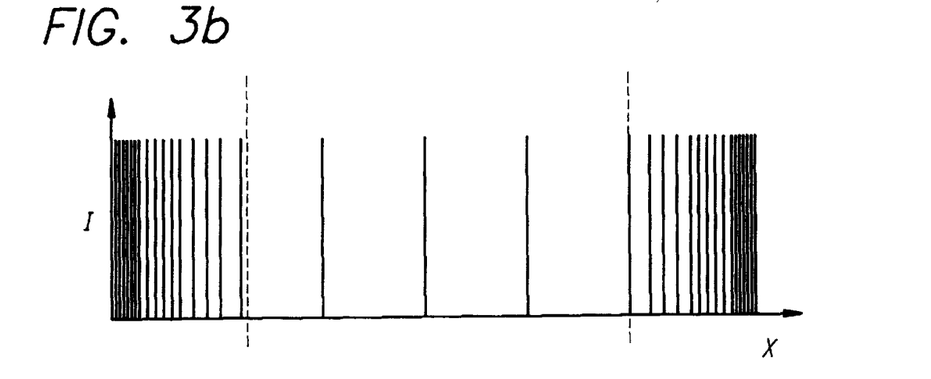
FIG. 3b is a graph depicting the exposure positions of constant intensity laser pulses being pulsed at a constant time interval where the scanning velocity of the laser vanes across the scan line.
Figure 3C:
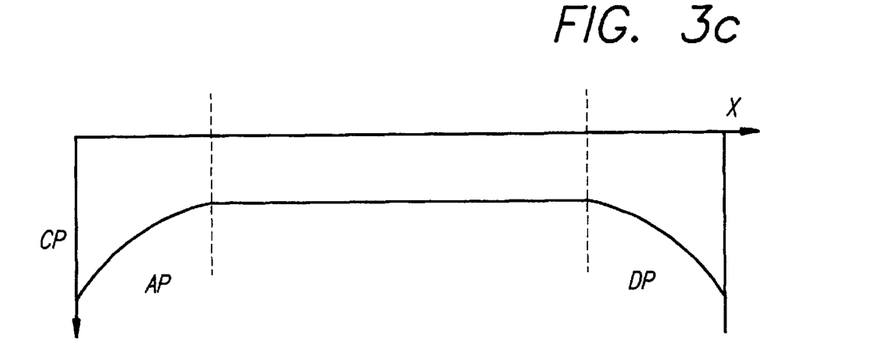
FIG. 3c is a graph depicting the cure depth resulting from the superposition of exposure pulses depicted in FIG. 3b.

As shown in FIGS. 3a–3c, the problem of a greater exposure at the beginning and end of the scan lines is also present in the case of constant repetition rate pulsed lasers. FIG. 3a depicts the laser pulses as a function of time. As shown, the pulses are constant and evenly spaced. FIG. 3b depicts the resulting pulses of FIG. 3a as a function of position. As seen in FIG. 3b, an increased density of pulses occurs at the positions scanned during the acceleration and deceleration phases. The cure profile resulting from the constant laser pulse is shown in FIG. 3c. A comparison of FIG. 3c to FIG. 2d reveals the similarity between the cure profiles in the case utilizing a continuous wave laser (i.e., cw laser) and the case utilizing a constant-repetition-rate pulsed laser. As can be seen from the nonuniform cure profiles, there is a need in the industry to eliminate the dependency of the exposure of the liquid medium from the scanning speed.

The problems described herein above are addressed singly and/or in combination by the invention and are illustrated in the embodiments to be discussed herein after.

RELATED U.S. PATENTS AND APPLICATIONS

The applications and patents in the following table are hereby incorporated by reference herein as if set forth in full. The gist of each patent and application is included in the table to aid the reader in finding specific types of teachings. It is not intended that the incorporation of subject matter be limited to those topics specifically indicated, but instead the incorporation is to include all subject matter found in these applications and patents (and the applications giving rise to them).

| Patent No. Application No. | Inventor | Subject |
| --- | --- | --- |
| 4,575,330 | Hull | Discloses fundamental elements of stereolithography. |
| 4,999,143 | Hull et al. | Discloses various removable support structures applicable to stereolithography. |
| 5,058,988 | Spence | Discloses the application of beam profiling techniques useful in stereolithography for determining cure depth and scanning velocity, etc. |
| 5,059,021 | Spence et al. | Discloses the utilization of drift correction techniques for eliminating errors in beam positioning resulting from instabilities in the beam scanning system |
| 5,104,592 | Hull | Discloses various techniques for reducing distortion, and particularly curl type distortion, in objects being formed by stereolithography. |
| 5,123,734 | Spence et al. | Discloses techniques for calibrating a scanning system. In particular techniques for mapping from rotational mirror coordinates to planar target surface coordinates are disclosed |
| 5,133,987 | Spence et al. | Discloses the use of a stationary mirror located on an optical path between the scanning mirrors and the target surface to fold the optic path in a stereolithography system. |
| 5,174,931 | Almquist et al. | Discloses various doctor blade configurations for using in forming coatings of medium adjacent to previously solidified laminae. |
| 5,182,056 | Spence et al. | Discloses the use of multiple wavelengths in the exposure of a stereolithographic medium. |
| 5,182,715 | Vorgitch et al. | Discloses various elements of a large stereolithographic system. |
| 5,184,307 | Hull et al. | Discloses various techniques for converting three-dimensional object data into data descriptive of cross-sections (the appendices forming part of the application giving rise to this patent provide further details regarding stereolithography systems and processes). |
| 5,192,559 | Smalley et al. | Discloses various recoating and exposure techniques to reduce the discontinuity between layers. |
| 5,238,639 | Vinson et al. | Discloses a technique for minimizing curl distortion by balancing upward curl to downward curl. |
| 5,256,340 and 08/766,956 | Allison et al. | Discloses various build/exposure styles for forming objects including various techniques for reducing object distortion, including techniques to (1) build hollow, partially hollow, and solid objects, (2) achieve more uniform cure depth, (3) expose layers as a series of separated tile or bullets, (4) etc. |
| 5,321,622 | Snead et al. | Discloses the use of Boolean operations in stereolithography and especially Boolean operations to convert three-dimensional object data into cross-sectional data. |
| 5,597,520 and | Smalley et al. | Discloses various exposure techniques for enhancing object formation accuracy including |

-continued

| Patent No. Application No. | Inventor | Subject |
|---|---|---|
| 5,999,184 | | techniques for dealing with minimum solidification depths greater than one layer thickness and minimum recoating depths greater than the desired layer thickness resolution. |
| 08/722,335 now abandoned | Thayer et al. | Discloses build and support styles for use, primarily, in a selective deposition modeling system. |
| 5,943,235 | Earl et al. | Discloses data manipulation and system control techniques for use in a selective deposition modeling system. |
| 5,902,537 | Almquist et al. | Discloses various recoating techniques for use in stereolithography. |
| 5,840,239 | Partanen et al. | Discloses the application of solid-state lasers to stereolithography. |

SUMMARY OF THE DISCLOSURE

One aspect of the invention is directed to a method of forming a 3D object from a solidifiable medium, including the steps of forming a coating of solidifiable medium adjacent to a previously formed lamina in preparation for forming a subsequent lamina of the object; selectively exposing a target surface of the solidifiable medium to a beam of pulses of electromagnetic radiation to form a subsequent lamina of the object and to adhere the subsequent lamina to the previously formed lamina; repeating the forming and exposing steps to form the three-dimensional object from a plurality of adhered laminae; and correlating at least some of the pulses during formation of at least one of the lamina so as to cause the electromagnetic radiation to substantially impinge upon desired positions on the surface of the medium.

A second aspect of the invention is directed to an apparatus for forming a three-dimensional object, including a source of pulsed radiation capable of solidifying a solidifiable medium at a target surface; at least one optical element located along an optical path between the source of pulsed radiation and the target surface and controlled to direct the pulsed radiation to selected locations on the targeted surface; an encoder functionally coupled to the at least one optical element for providing beam positioning data; a trigger device for comparing beam position data with desired pulsing position data and for causing the source to produce pulses of radiation so that pulsing occurs when the beam position data and pulsing position data are correlated; and at least one computer capable of providing the trigger device with desired pulsing positions.

A third aspect of the invention is directed to an apparatus for forming a three-dimensional object, including a source of pulsed radiation capable of solidifying a solidifiable medium at a target surface; at least one optical element located along an optical path between the source of pulsed radiation and the target surface and controlled to direct the pulsed radiation to selected locations on the targeted surface; an encoder functionally coupled to the at least one optical element for providing beam positioning data; a trigger for causing the source to produce pulses of radiation; at least one computer capable of providing the trigger with a trigger signal so that pulsing occurs when the beam position data is substantially correlated to desired pulsing positions.

Additional aspects of the invention can be found in the claims appended hereto and will be understood by one of skill in the art upon reviewing this disclosure. It is intended that the various aspects of the invention can be practiced separately or in combination.

Embodiments of the instant invention are directed to a method and apparatus for utilizing a pulsed radiation source (e.g, a laser) in the formation of a three-dimensional object; namely, in controlling the exposure of the surface of a solidifiable medium (e.g. a liquid photopolymer, a sinterable powder, and the like). Preferred embodiments comprise a pulsed laser assembly, a control computer and a beam positioning device (e.g., a plurality of mirrors having encoders which supply information as to where the beam is being directed). The pulsed laser assembly further includes a laser and a pulse generation device.

The control computer directs the movement of the mirrors to direct the beam across the surface of the liquid medium based upon predetermined data descriptive of the object being formed (e.g., CAD input). In addition, the computer contains or provides to the pulse generation device the mirror positions upon which to pulse. As the mirror encoder (s) provide position information to the computer or to the pulse generation device, a comparison of actual beam position to pulsing position is made and the computer supplies a pulse trigger signal to the pulse generation device or alternatively the pulse generation device performs the comparison and generates the pulse trigger signal itself.

An object of embodiments of the instant invention is to obtain a controlled exposure over a desired area of surface medium.

Another object of embodiments of the instant invention is to reduce distortion.

A further object of embodiments of the instant invention is to achieve various defined exposures within a given cross-sectional region.

The above and other objects of this invention will be apparent from the following more detailed description when taken in conjunction with the accompanying drawings of illustrative embodiments. It is intended that the above objects can be achieved separately by different aspects of the invention and that additional objects of the invention will involve various combinations of the above independent objects such that enhanced benefits may be obtained from combined techniques.

BRIEF DESCRIPTION OF THE DRAWINGS

The detailed description of the embodiments of the invention will be made with reference to the accompanying drawings, wherein like numerals designate corresponding parts in the several figures.

FIG. 5b is a graph depicting the cure depth resulting from the superposition of exposure pulses depicted in FIG. 5a.

DESCRIPTION OF PREFERRED EMBODIMENTS

Figure 4A:
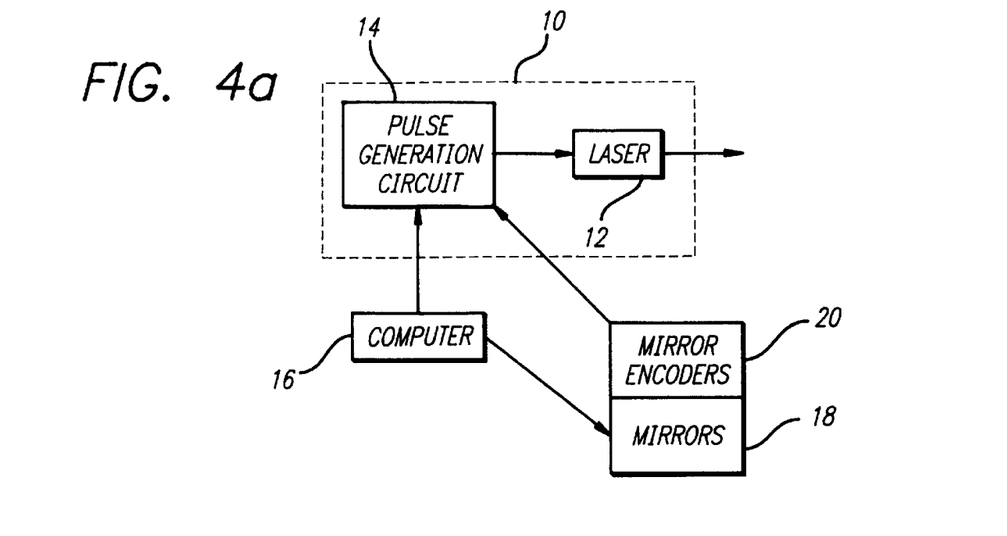
FIG. 4a is a block schematic of a preferred embodiment of the instant invention.

Preferred embodiments of the instant invention comprise a pulsed laser assembly 10, including a laser 12 and a pulse generation circuit 14, single or multiple control computers 16 and/or single or multiple data processing systems such as digital signal processors (not shown) and a plurality of mirrors 18 having mirror encoder(s) 20. FIG. 4a depicts a block schematic of a preferred embodiment of the instant invention.

As noted above, the '347 application discloses details of preferred solid state lasers for use in the instant invention. Solid state lasers commercially used in stereolithography produce radiation at approximately 355 nm. A preferred solid-state laser is Model No. T20-B10-355Q-11 by Spectra-Physics Lasers, Inc. of Mountain View, Calif. To achieve this wavelength the fundamental frequency line 1064 nm generated from the laser is tripled. In other preferred embodiments, the fundamental 1342 nm frequency line is quadrupled. Although the laser 12 typically utilized in the pulsed laser assembly 10 is a pulsed laser, any configuration capable of generating a pulsed beam, such as, but not limited to, the use of a continuous output laser (e.g. a HeCd laser emitting at 325 nm and an $Ar^+$ laser emitting at 351 nm) with an acousto-optical modulator, is suitable. In some preferred embodiments a very small duty cycle (time of pulse width, i.e. pulse duration, divided by the sum of pulse duration width and dead time between pulses) is preferred. Duty cycles of less than 10% are preferred, less than 1% more preferred, and most preferrably less than 0.1%. Alternatively, as the beam is being moved over the target surface at a desired velocity, pulse time widths small enough to yield a spatial spreading of the beam by less than a maximum specified spatial amount are preferred. The preferred maximum spatial amounts may be specified in various ways. In some embodiments it may be satisfactory to limit the beam spreading to under 0.025 mm (or 10% of the diameter of a 0.25 mm beam). In other embodiments it may be desired to limit the spreading to less than 25 microns (e.g. 2.5 microns) or maybe even to a smaller percentage of the beam diameter (e.g. 1%). Limiting the spreading of pulses in this manner has the advantage of being able to locate the pulse positions and related areas of influence on the target surface precisely without having to consider what direction the beam may have been moving in at the time the pulse was made. Of course alternative embodiments could use pulses with larger duty cycles and/or spreading wherein techniques for accounting for beam spread may be utilized.

The pulse generation circuit 14 triggers the laser to emit a pulse of radiation based on the mirror position readings from the mirror encoders 20. Depending on the delay involved in generating, transmitting, and acting on the pulse generation trigger signal, the correlation between actual position and pulsing position may include correction factors appropriate to cause pulsing to occur substantially on pulsing positions as opposed to generating pulse trigger commands when the pulsing positions and actual positions coincide. This positional dependency for firing pulses allows a uniform exposure of the medium to be obtained. It also and allows multiple exposures to be used wherein pulse positions between successive pulses are correlated.

Figure 5A:
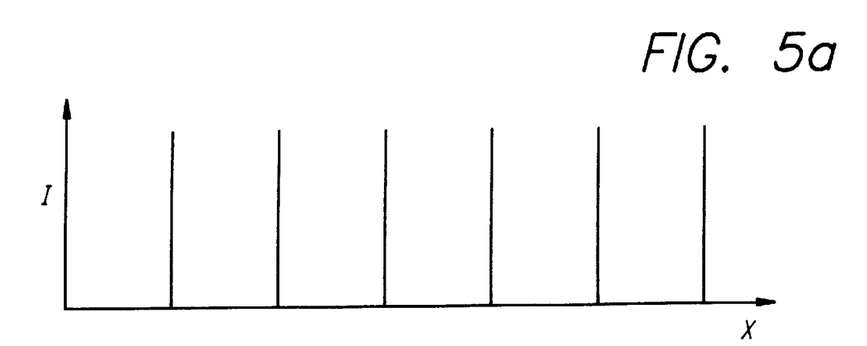
FIG. 5a is a graph depicting the laser pulses generated at a constant position or distance interval.
Figure 5B:
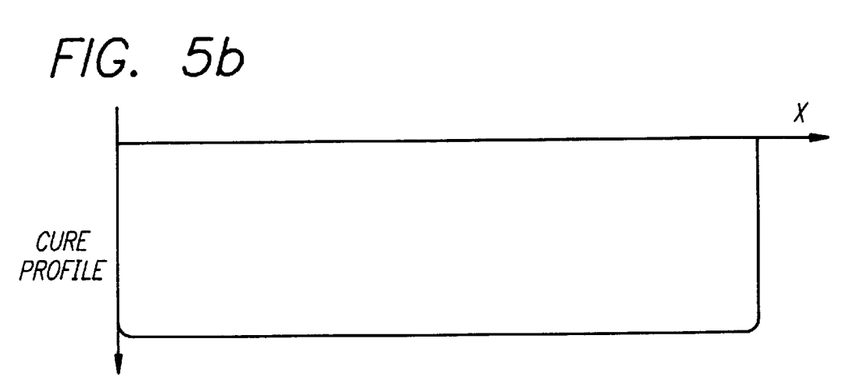

In one preferred embodiment, the pulse generation circuit 14 generates pulses at constant position intervals along the target surface. These pulsing positions may be laid out in a square grid pattern, rectangular grid, or other patter. As noted above, the firing or triggering positions may not be identical to the pulsing positions. FIG. 5a is a graph depicting pulses from laser 12 positioned at equal position intervals along a line. FIG. 5b depicts the cure profile for the pulses represented in FIG. 5a. As shown in FIG. 5b, a uniform exposure results even if the mirrors 18 have a varying angular velocity since the pulsing of the laser 12 is not time dependent, but rather, positionally dependent.

In another preferred embodiment the pulse generation circuit 14 generates pulses at a constant angular displacement intervals for a pair of X- and Y-rotatable scanning mirrors. This method of defining pulse positions does not provide uniformly spaced positions. The non-uniformity of position placement increases as the angular displacement of the beam increases from the normal path relative to the target surface. At 5°, 10°, and 15° degree displacements of the beam path from the normal path, the spacing between successive pulses is increased by about 1%, 3%, and 7% respectively. For small angular displacements from the vertical, this alternative approximates a uniform placement of pulses and may therefore represent a reasonable technique for controlling pulse position. This approach to controlling pulse position may represent a reasonable approach even for large angular beam path deviations from the normal. This is particularly true if steps are taken to account for associated loss of net exposure as pulse spacing increases, for example, by controlling the pulse energy relative to the location on the target surface.

Figure 6:
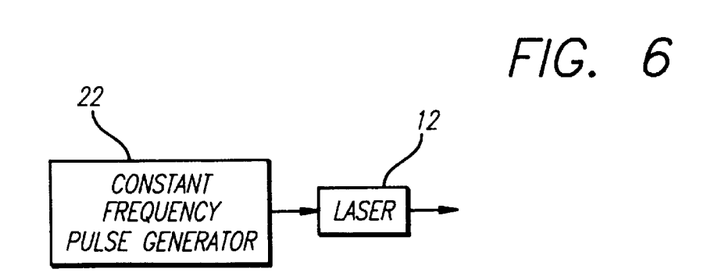
FIG. 6 is a block schematic of an apparatus utilizing a constant frequency pulse generator.

In contrast to the preferred embodiment of FIG. 4a which utilizes a positional dependent pulse generator, FIG. 6 depicts a system utilizing a constant frequency pulse generator 22. As previously discussed, a constant frequency pulse generator 22 results in a situation where the pulse is constant in time (FIG. 3a), but results in variable spatial distances between pulses (FIG. 3b) when angular velocity of the mirrors 18 vary and, thus, results in a non-uniform cure depth (FIG. 3c).

As illustrated in FIGS. 5a and 5b, the correlation of pulsing to target surface position eliminates the dependency of spatial pulse separation, at the target surface, on the velocity of the scanning mirrors 18. This eliminates the problem of regions on the target surface unintentionally receiving varying amounts of exposure. Indeed, the correlation of pulses to position allows the control of exposure not just in view of scanning system velocity changes but also in view of crisscrossing or overlapping exposure paths. If each firing position on the surface is predetermined to receive a certain number of pulses (e.g., 0, 1, 2 . . . ), then a desired cure of each position can be achieved regardless of how raster or vector paths overlap as long as firing is inhibited over points which have received their desired number of pulses and before ending exposure of the layer, it is confirmed that all positions have received the proper number of pulses. For example when forming a down-facing portion of a lamina, though several overlapping or crisscrossing vector types may exist, it is generally desired that each point in the down-facing region be given substantially the same exposure so that the depth of cure is uniform.

To obtain a desired solidified layer, the beam from laser 12 is guided by the mirrors 18 over the surface medium such that a desired cross-section is traced. Preferred scanning mirror assemblies include a pair of independently positionable X- and Y-rotatable scanning mirrors. Each mirror is preferably mounted to the shaft of a computer controlled motor/encoder combination. An example of such a computer controlled motor/encoder combination is Model No. K1GHC sold by Canon USA of Lake Success, New York. The movement of the mirrors 18, in turn, is controlled by the computer 16. The computer 16 communicates with the mirrors 18 and commands the mirrors 18 to move in a manner which is predetermined by the object design, selected build style being utilized, and performance capabilities of the mirrors.

In preferred embodiments of the instant invention, the computer 16 further communicates with and possibly controls the pulsing circuit 14. The computer 16 provides the desired pulse positions (e.g., mirror positions) to the pulsing circuit 14. The pulsing circuit 14 waits for the mirror encoders 20 to reach these desired positions or to at least reach firing positions correlated to the pulsing positions. When the encoders 20 reach these positions, the pulsing circuit 14 generates a trigger pulse for the laser 12. Pulse position data may be loaded into a bit map memory in pulsing circuit 14 wherein actual encoder positions are compared to the bit map to determine whether or not a trigger signal is to be generated. Alternatively, a combination of one or more encoder positions, and the time that each encoder position is reached may be utilized to project a time at which the beam will be directed at a desired pulse position. Based on this projected time, a firing signal can be generated to cause the beam to pulse on the desired position. Further details on performing this type of timed fire technique involving encoder position, pulse position, and trigger timing as applied to linear rails are described in the above referenced '326 application. Further, utilizing this technique, firing (pulsing) locations can be achieved with higher resolution, lower resolution, or simply different firing locations than that dictated by the positioning system encoders. The '326 application describes this technique as applied to linear rails and as applied to selective deposition modeling, using droplets of material (instead of photons). In view of the teachings herein, the use of these linear rail techniques can be extended to the instant invention. In one preferred embodiment, the computer 16 controls the mirror movement through the use of vector data. In another preferred embodiment, the computer 16 utilizes a raster representation to control the mirror movement. Combined or other data formats may also be used.

Figure 4B:
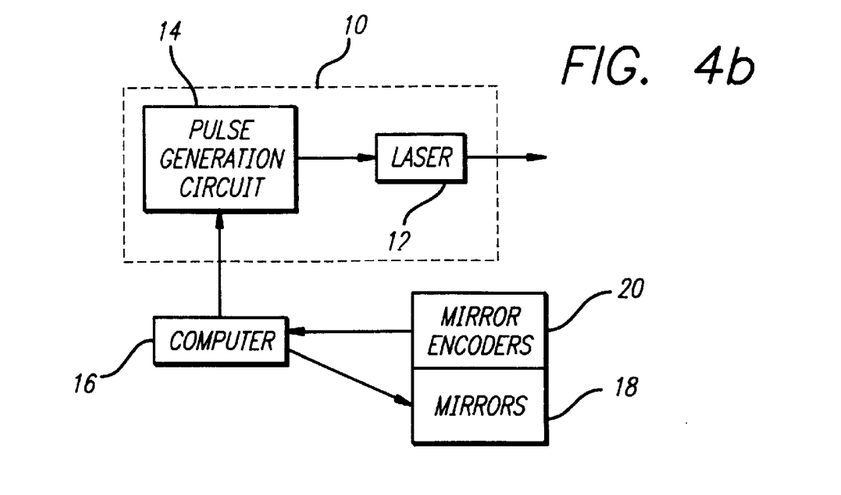
FIG. 4b is a block schematic of another preferred embodiment of the instant invention.

In another preferred embodiment, as shown in FIG. 4b, the computer does not supply pulse position information to the pulse generation circuit. Instead, the computer supplies pulsing commands. In this preferred embodiment, the mirror encoder information is provided to the computer, not to the pulse generation circuit. The computer processes the encoder information and determines when to fire the laser such that pulsing at substantially desired locations on the surface of the medium occurs. In this preferred embodiment, like in the embodiment of FIG. 4a, pulsing of the laser does not necessarily occur at encoder positions.

Prior to solidifying a given layer of medium, cross-sectional layer data is provided to the computer 16. From the cross-sectional data, the computer 16 selects a plurality of positions on the surface of the liquid at which to direct a desired number of laser pulses. These predefined positions and pulse numbers are then communicated to the laser 12, via the pulsing circuit 14. Alternatively, as noted above, this information may remain in the computer 16 and only pulse trigger signals or pulse commands are sent to the pulsing circuit 14. These predefined positions define the mirror positions, which correspond to positions on the surface of the liquid, upon which to fire the laser 12. This direct control of the laser pulsing eliminates the acceleration and deceleration problems associated with the mirror movement required when tracing the target surface. As noted above, this direct control may also eliminate unwanted multiple exposures of locations which might occur due to partially redundant data. Thus, a more even exposure across the surface of the liquid may be obtained.

Figure 7A:
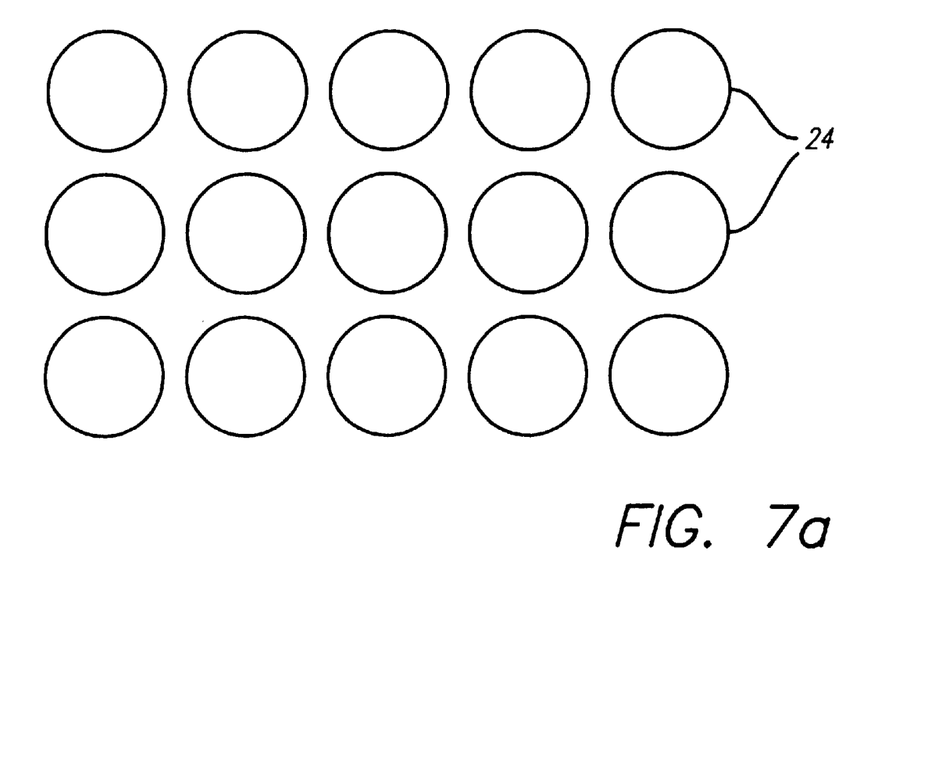
FIG. 7a depicts the results of a first exposure of a preferred multiple exposure technique that initially solidifies a set of isolated elements of the medium.
Figure 7B:
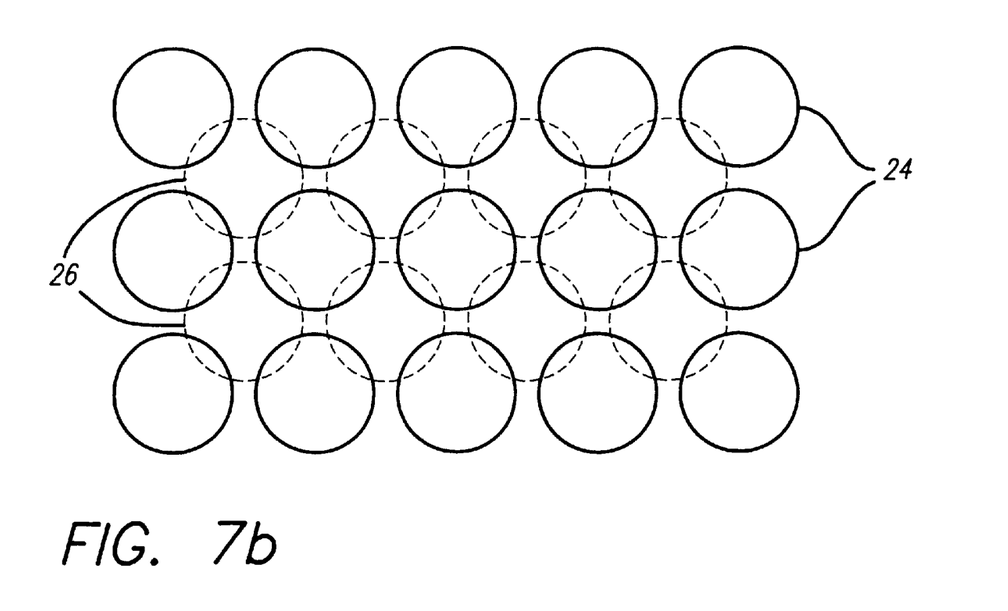
FIG. 7b depicts the results of a second exposure, superimposed on the elements of FIG. 7a, that exposes positions intermediate to the isolated elements.

In addition to eliminating the problems associated with the acceleration and deceleration of the mirrors 18, and problems associated with redundant data, preferred embodiments of the instant invention may further aid in the reduction of problems associated with shrinkage, such as for example, curl distortion, as shown in FIG. 1. To reduce problems associated with shrinkage, different exposure techniques utilizing pulsed laser 12 can be used. For example, an interlacing technique can be used during the formation of the layer which includes at least two exposures. In preferred embodiments, the first exposure solidifies a set of isolated portions of the surface medium, or islands 24, as shown in FIG. 7a. After the first exposure, each isolated island 24 shrinks, but does not connect with an adjacent island 24 such that a strain is caused in the lamina. The second exposure 26 exposes positions of the liquid layer intermediate to the island positions exposed during the first exposure, as shown in FIG. 7b. Even if the second exposure causes the initially nonsolidified material to shrink, the total strain due to the shrinkage may be reduced. A build style utilizing bullets of exposure produced by jumping a beam from a cw laser to spaced points on the surface of the medium is described in the previously referenced '340 patent. In view of the teachings herein, various alternative techniques described in the '340 patent and the other patents and applications incorporated herein by reference may also be utilized in combination with the instant invention. In other preferred embodiments the points exposed during the first exposure may overlap. In other preferred embodiments, the second exposure can be used to reexpose a plurality of points exposed during the first exposure. In another preferred embodiment, additional exposure may be applied via one or more subsequent exposures. In some of the preferred exposure techniques, pulses subsequent to the first exposure have a different pulse diameter than the diameter used in the first exposure.

Determination of the firing positions and the number of exposures for a given cross-section per position on the target surface depend, in part, on the lamina geometry and exposure requirements. Although any method of determining the positions that meet these requirements is suitable, in one preferred embodiment, the predefined positions are determined by adding a particular desired spacing from an initial position to obtain each of the plurality of additional positions. In another preferred embodiment, the predefined positions are determined by adding a desired spacing from an immediately adjacent position. This manner of calculating the positions may result in a variety of point positioning patterns on the surface, such as, for example, a rectangular grid of uniformly spaced points or a hexagonal grid of spaced points. In other preferred embodiments a variable spacing between the points may result. In some preferred embodiments, a feature of the object will determine some or all of the firing positions for the layer.

In other embodiments, correlation of pulsing position and pulsing may occur only at a portion of the positions which will be exposed on a given lamina. Some positions or whole laminae may be exposed without correlation when it is deemed unnecessary. For example, a further embodiment might involve multiple scanning of the same or varying positioning data where each scan is performed using a constant time pulsing of the laser where only an initial pulsing of the laser and an initial pulsing position per scan are correlated.

The predefined positions for a given layer can be utilized in the formation of one layer or a plurality of layers. Thus, a first layer might be defined by uniformly spaced grid points (i.e. pulsing positions) and, for example, in the next five subsequent layers the points could be spaced by variable amounts. Therefore, in some instances, the points between two adjacent layers will overlap, and in other instances the points between two adjacent layers will be offset.

As stated above, the laser radiation may be directed onto the target via the plurality of mirrors 18. The mirrors 18 may be a pair of rotatable scanning mirrors 18 which are independently positionable and are oriented to scan the beam in a perpendicular orientation (e.g., x- and y-orientation) with respect to each other. Thus, issuance of a pulse command from the pulsing circuit 14 can be correlated to one, some or all of the mirror rotations. In other preferred embodiments, other elements may be used to cause scanning of the beam. For example, in one preferred embodiment, mirrors on linear rails are used. The use of mirrors on linear rails are described by Herbert, Alan J., in the *Journal of Applied Photographic Engineering* 8: 185, 187 (1982), which is incorporated herein by reference. In other preferred embodiments, scanning may be caused by the movement of a fiber optic bundle on an XY carriage. Use of a fiber optic bundle is described in the '330 patent which is fully incorporated herein by reference. In still other preferred embodiments, a deformable lens or other components may be used to cause scanning.

The plurality of rotatable mirrors 18 or other scanning devices preferrably include encoders 20. The encoders 20 monitor the position of the mirrors 18 or other scanning device and relay actual scanner or beam positions to computer 16 or pulsing circuit 14. Based upon previous instructions from the computer 16, in some preferred embodiments, the pulsing circuit 14 directs the laser 12 to pulse when it receives confirmation of specific mirror coordinates from the mirror encoders 20. In other preferred embodiments, the pulsing circuit 14 issues the pulse commands in anticipation of the mirrors 18 reaching a desired position.

In the embodiment depicted in FIG. 4b, the encoders 20 relay the mirror position data to the computer 16. In this embodiment, the computer 16 directs the laser 12 to pulse. In another embodiment where the computer 16 receives mirror position data from the encoders 20, the computer may communicate with an acousto-optical modulator ("AOM") or fast shutter (not shown) to inhibit laser pulses from reaching the target surface. Further, the AOM can be used as an attenuator to modulate the output power of the laser 12 to a desired amount. An example of an AOM useable in the instant invention is Model No. ASM-704B8 sold by Intra Action Corporation of Bellwood, Ill.

In operation, for a given layer to be solidified, the computer 16 determines the desired positions to be exposed, as well as the number of pulses required to expose a given position. The computer 16 may send this information to the pulsing circuit 14. The computer 16 then directs the scanning of the mirrors 18 on the target surface. During scanning, the encoders 20 determine the position of the beam on the target surface as directed there by mirrors 18 and sends updated information to either the computer 16 or the pulsing circuit 14. This updated position information is correlated to the pulse location and pulse number information stored in the computer 16 or pulsing circuit 14. Based on the correlation, laser pulsing is made to occur to expose the preselected positions on the target surface to selectively expose the building medium. If it is desired that the number of pulses impinging on any location be precisely controlled, it may be advantageous to predefine the scanning pattern data such that the proper number of pulses are given to each location or alternatively it may be appropriate to record or decrement the number of pulses that each location is to receive after pulsing on each position or series of positions. It may be of further advantage to define at least two types of scanning system movement: (1) movements during which pulsing can occur, and (2) movements in which pulsing should not occur even if the scanning system encoders indicate that the scanning system has located the beam over a pulsing position.

In implementing the above invention various data manipulations may be performed. One such set of manipulations might involve the following steps:

(1) Receive data representing a 3D object, for example in the STL file format.

(2) Convert the object data into cross-sectional data, for example using the teachings of the '307 and/or '622 patents.

(3) For a cross-section, convert the cross-sectional data into data descriptive of scanning paths to be followed, for example following the teachings of the '307, '622 and/or '715 patents.

(4) Convert one copy of the scanning path data into scanning system positioning data including any system calibration data and drift correction data, for example following the teachings of the '121 and '734 patents.

(5) From a combination of the cross-sectional data, scanning system positioning data, and build style data, define pulse positions for the cross-section.

(6) Move the beam along the paths defined by the scanning path data and compare the actual beam position to pulsing positions.
   a. Pulse the laser when pulsing positions or firing positions are encountered.
   b. Decrement the pulse count for each position that has received a pulse. When zero pulses are remaining for a given pulsing position, that position is redefined as a non-pulsing position.

(7) After, or periodically during, the movement of the beam, analyze the pulsing position data to determine whether any positions were missed. If positions were missed, direct the beam to those positions for completion of pulsing.

(8) Repeat steps (2)–(7) for the next lamina to be formed.

Various alternatives to the above steps are possible and will be apparent to one of skill in the art based on the teachings herein. For example, steps (2) and (3) may be combined into a single step. In some embodiments it may be acceptable to define pulsing locations as a fixed grid regardless of the explicit cross-sectional configuration and explicit scanning system commands wherein the beam is forced to primarily stay within the cross-sectional boundaries to be exposed and non-pulsing mirror positioning commands or AOM shuttering commands are utilized whenever the beam is anticipated to move outside the cross-sectional region. Alternatively, scanning system positioning data and or scanning path data may be utilized to define non-pulsing positions outside of the cross-sectional region such that whenever the scanning system locates the beam outside the cross-sectional region, the beam is not allowed to pulse or pulses are physically blocked from reaching the target area by a shutter. In other alternatives it is possible to modify step (6) such that when the beam is being scanned at an essentially fixed velocity, pulse positions are not explicitly utilized to cause pulsing of the laser; but instead pulsing is based on anticipated pulse locations. In other embodiments step (7) may be eliminated where it is simply assumed that all pulsing positions received substantially the proper number of pulses based on the mirror positioning commands utilized in directing the beam.

The teachings herein can be utilized to modify various RP&M systems. Examples of such systems include, the SLA-500/40, SLA-350/10, and SLA-250/50 as manufactured by 3D Systems, Inc of Valencia, Calif. The SLA 500/40 operates with an $Ar^+$ gas laser at 351 nm, with an external acousto-optic modulator, and with computer controlled rotary motor driven X- and Y-scanning mirrors. The SLA 350/10 operates with a frequency-tripled $Nd/YVO_4$ solid-state laser producing 355 nm radiation and with computer controlled rotary motor driven X- and Y-scanning mirrors. The SLA 250/50 operates with HeCd gas laser emitting 325 nm radiation and with computer controlled galvanometer driven X- and Y-scanning mirrors. Preferred photopolymers for use in these systems include, Product Nos. SL 5180 (for 351 nm radiation); SL 5190 (for 355 nm radiation), and SL 5170 (for 325 nm radiation), all manufactured by Ciba Specialty Chemicals of Los Angeles Calif. Other Ciba manufactured photopolymers for use with 355 nm radiation include [Ciba Internal Nos. 71030 and 71050 corresponding to] Product Nos. SL5195 and SL5510. Other photopolymers for use with 355 nm radiation include Somos 6120 as manufactured by The Dupont Company: Somos Solid Imaging Materials of New Castle, Del. and Exactomer HTG35X as manufactured by Allied Signal of Morristown, N.J.

Although the foregoing has illustrated the invention with preferred embodiments, this is not intended to limit the invention. Rather, the foregoing is intended to cover all modifications and alternative constructions falling within the spirit and scope of the invention as expressed in the appended claims.

What is claimed is:

1. An apparatus for forming at least a portion of a three-dimensional object from a solidifiable medium, comprising:
    a source of pulsed radiation capable of transforming the solidifiable medium at a target surface to form at least a portion of a lamina of the object;
    at least one optical element located along an optical path between the source of pulsed radiation and the target surface and controlled to direct a beam of pulsed radiation to selected locations at the target surface;
    an encoder functionally coupled to the at least one optical element for providing beam positioning data;
    a trigger device functionally coupled to at least the encoder and the source of pulsed radiation, the trigger device used for comparing beam position data with desired pulsing position data and for causing the source to produce pulses of radiation so that pulsing occurs when the beam position data and pulsing position data are substantially correlated; and
    at least one computer functionally coupled to at least the trigger device, and capable of providing the trigger device with desired pulsing positions.

2. The apparatus of claim 1 additionally comprising a system programmed to generate data indicating a plurality of predefined positions at the target surface at which the pulses are substantially directed.

3. The apparatus of claim 2 wherein the system is programmed to generate predefined positions comprising a grid of uniformly spaced locations.

4. The apparatus of claim 2 wherein the system is programmed to generate predefined positions comprising an initial position and a plurality of additional positions wherein each additional position had a desired spacing from the initial position.

5. The apparatus of claim 2 wherein the trigger device is configured to correlate at least some of the pulses during formation of a plurality of laminae.

6. The apparatus of claim 5 wherein the system is programmed to generate at least some positions on a first lamina that are offset from at least some positions on a second lamina.

7. The apparatus of claim 1 additionally comprising a system programmed to generate data for a first set of desired pulsing positions at the target surface and at least a second set of desired pulsing positions at the target surface wherein the second set comprises positions substantially intermediate to positions of the first set.

8. The apparatus of claim 7 wherein the system is programmed to generate data that causes the source of pulsed radiation to produce pulses at the first set of desired positions that result in at least some laterally isolated regions of solidified medium and pulses at the second set of desired positions that result in solidified medium that laterally joins at least some of the solidified regions from the first set of desired positions.

9. The apparatus of claim 7 wherein the system is programmed to generate data that causes the source of pulsed radiation to produce at least some pulses of a different diameter at the second set of desired pulsing positions than the pulses at the first set of desired pulsing positions.

10. The apparatus of claim 7 wherein the system is programmed to generate additional data comprising at least a third set of desired pulsing positions that result in solidified medium that joins at least some solidified medium resulting from the first and second sets of desired pulsing positions.

11. The apparatus of claim 1 additionally comprising a system programmed to generate data for a first set of desired pulsing positions at the target surface and at least a second set of desired pulsing positions at the target surface wherein the second set comprises at least some positions substantially identical to positions of the first set.

12. The apparatus of claim 2 wherein the system is programmed to generate data of predefined positions comprising a plurality of positions each having a desired spacing from an immediately adjacent position.

13. The apparatus of claim 12 wherein the system is programmed to generate data wherein the desired spacing is variable.

14. The apparatus of claim 2 wherein the trigger device is configured to cause the source of pulsed radiation to produce at least one pulse when the beam is positioned substantially at a desired target position.

15. The apparatus of claim 2 wherein the trigger device is configured to cause the source of pulsed radiation to produce at least one pulse in anticipation of the beam being directed substantially at a desired target position.

16. The apparatus of claim 15 wherein the trigger device is configured to take into consideration a velocity at which the beam is being scanned over the target surface.

17. The apparatus of claim 2 wherein the trigger device is configured to cause the source of pulsed radiation to produce at least one pulse in anticipation of the beam being directed substantially at a desired target position in a time increment necessary to process the command.

18. The apparatus of claim 1 wherein the at least one optical element comprises at least one computer controlled scanning mirror.

19. The apparatus of claim 18 additionally comprising a system programmed to generate at least some raster data for controlling the at least one scanning mirror.

20. The apparatus of claim 18 wherein the at least one computer controlled scanning mirror comprises a rotatable scanning mirror that undergoes mirror rotation.

21. The apparatus of claim 20 wherein the trigger device is configured to correlate the mirror rotation and the issuance of pulse commands and is configured to cause pulses to be directed at selected locations on the target surface corresponding to encoder positions.

22. The apparatus of claim 18 wherein the at least one computer controlled scanning mirror comprises two substantially perpendicularly oriented and independently positionable scanning mirrors and the issuance of pulse commands is correlated to the positioning of both mirrors.

23. The apparatus of claim 22 wherein both scanning mirrors are rotatable scanning mirrors.

24. The apparatus of claim 22 additionally comprising a system programmed to generate at least some vector data for controlling the scanning mirrors.

25. The apparatus of claim 2 wherein the at least one computer is programmed to vary at least one pulse parameter between at least two pulses, wherein the pulse parameter comprises at least one of pulse duration, pulse energy, pulse peak power, and pulse diameter.

26. The apparatus of claim 1 additionally comprising a system programmed to generate cross-sectional data representing laminae of the three-dimensional object.

27. The apparatus of claim 1 additionally comprising a system programmed to generate data dividing the target surface into a plurality of target positions wherein each target position that is to receive radiation receives a desired number of pulses.

28. The apparatus of claim 27 wherein the system is programmed to generate the desired number of pulses to be directed at each target position based on an amount of exposure to be achieved at each position.

29. The apparatus of claim 28 wherein the system is programmed to decrement the number of pulses to be directed substantially at each position.

30. The apparatus of claim 1 wherein the source of pulsed radiation is a pulsed laser.

31. The apparatus of claim 1 wherein the source of pulsed radiation is a modulated continuous output laser.

32. The apparatus of claim 2 wherein the system is programmed to generate locations of at least a portion of the plurality of predefined positions based on at least one feature of at least one lamina of the object.

33. The apparatus of claim 1 wherein the source of pulsed radiation comprises a beam of pulses having a time width separated by periods of no radiation.

34. The apparatus of claim 33 wherein the beam is configured to scan with a scanning velocity across the target surface, and is configured to move less than about 0.025 mm during the duration of a single pulse.

35. The apparatus of claim 33 wherein each pulse has a spatial beam width and the beam is configured to scan over the target surface with a predetermined velocity, and the beam is configured to move over the target surface less than about 10% of the spatial beam width during the duration of a single pulse.

36. The apparatus of claim 33 wherein the beam of pulses has an average duty cycle less than or equal to about 1%.

37. The apparatus of claim 36 wherein the average duty cycle is less than or equal to about 0.1%.

38. The apparatus of claim 2 wherein the system is programmed to generate the plurality of predefined positions defining at least one entire lamina.

39. The apparatus of claim 2 wherein the system is programmed to generate the plurality of predefined positions defining at least a portion of at least one of the laminae.

40. The apparatus of claim 1 additionally comprising a system programmed to generate data that causes the source of pulsed radiation to produce pulses at a first set of desired positions that result in at least some laterally joined regions of a solidified medium.

41. An apparatus for forming at least a portion of a three-dimensional object from a solidifiable medium, comprising:

a source of pulsed radiation capable of transforming the solidifiable medium at a target surface to form at least a portion of a lamina of the object, at least one optical element located along an optical path between the source of pulsed radiation and the target surface and controlled to direct a beam of pulsed radiation to selected locations on the target surface;

an encoder functionally coupled to the at least one optical element for providing beam positioning data;

a trigger device functionally coupled to at least the source of pulsed radiation, the trigger device causing the source to produce pulses of radiation; and at least one computer functionally coupled to at least the trigger and the encoder, and capable of providing the trigger with a trigger signal so that pulsing occurs when the beam position data is substantially correlated to desired pulsing positions.

42. The apparatus of claim 41 additionally comprising a system programmed to generate data indicating a plurality of predefined positions at the target surface at which the pulses are substantially directed.

43. The apparatus of claim 42 wherein the system is programmed to generate predefined positions comprising a grid of uniformly spaced locations.

44. The apparatus of claim 42 wherein the system is programmed to generate predefined positions comprising an initial position and a plurality of additional positions wherein each additional position had a desired spacing from the initial position.

45. The apparatus of claim 42 wherein the at least one computer is configured to correlate at least some of the pulses during formation of a plurality of laminae.

46. The apparatus of claim 45 wherein the system is programmed to generate at least some positions on a first lamina that are offset from at least some positions on a second lamina.

47. The apparatus of claim 41 additionally comprising a system programmed to generate data for a first set of desired pulsing positions at the target surface and at least a second set of desired pulsing positions at the target surface wherein the second set comprises positions substantially intermediate to positions of the first set.

48. The apparatus of claim 47 wherein the system is programmed to generate data that causes the source of pulsed radiation to produce pulses at the first set of desired positions that result in at least some laterally isolated regions of solidified medium and pulses at the second set of desired positions that result in solidified medium that laterally joins at least some of the solidified regions from the first set of desired positions.

49. The apparatus of claim 47 wherein the system is programmed to generate data that causes the source of pulsed radiation to produce at least some pulses of a different diameter at the second set of desired pulsing positions than the pulses at the first set of desired pulsing positions.

50. The apparatus of claim 47 wherein the system is programmed to generate additional data comprising at least a third set of desired pulsing positions that result in solidified medium that joins at least some solidified medium resulting from the first and second sets of desired pulsing positions.

51. The apparatus of claim 41 additionally comprising a system programmed to generate data for a first set of desired pulsing positions at the target surface and at least a second set of desired pulsing positions at the target surface wherein the second set comprises at least some positions substantially identical to positions of the first set.

52. The apparatus of claim 42 wherein the system is programmed to generate data of predefined positions comprising a plurality of positions each having a desired spacing from an immediately adjacent position.

53. The apparatus of claim 52 wherein the system is programmed to generate data wherein the desired s pacing is variable.

54. The apparatus of claim 42 wherein the at least one computer and the trigger device are configured to cause the source of pulsed radiation to produce at least one pulse when the beam is positioned substantially at a desired target position.

55. The apparatus of claim 42 wherein the at least one computer and the trigger device are configured to cause the source of pulsed radiation to produce at least one pulse in anticipation of the beam being directed substantially at a desired target position.

56. The apparatus of claim 55 wherein the at least one computer is configured to take into consideration a velocity at which the beam is being scanned over the target surface.

57. The apparatus of claim 42 wherein the at least one computer and the trigger device are configured to cause the source of pulsed radiation to produce at least one pulse in anticipation of the beam being directed substantially at a desired target position in a time increment necessary to process the command.

58. The apparatus of claim 41 wherein the at least one optical element comprises at least one computer controlled scanning mirror.

59. The apparatus of claim 58 additionally comprising a system programmed to generate at least some raster data for controlling the at least one scanning mirror.

60. The apparatus of claim 58 wherein the at least one computer controlled scanning mirror comprises a rotatable scanning mirror that undergoes mirror rotation.

61. The apparatus of claim 60 wherein the at least one computer is configured to correlate the mirror rotation and the issuance of pulse commands and ,together with the trigger device is configured to cause pulses to be directed at selected locations on the target surface corresponding to encoder positions.

62. The apparatus of claim 58 wherein the at least one computer controlled scanning mirror comprises two substantially perpendicularly oriented and independently positionable scanning mirrors and the issuance of pulse commands is correlated to the positioning of both mirrors.

63. The apparatus of claim 62 wherein both s canning mirrors are rotatable scanning mirrors.

64. The apparatus of claim 62 additionally comprising a system programmed to generate at least some vector data for controlling the scanning mirrors.

65. The apparatus of claim 42 wherein the at least one computer is programmed to vary at least one pulse parameter between at least two pulses, wherein the pulse parameter comprises at least one of pulse duration, pulse energy, pulse peak power, and pulse diameter.

66. The apparatus of claim 41 additionally comprising a system programmed to generate cross-sectional data representing laminae of the three-dimensional object.

67. The apparatus of claim 41 additionally comprising a system programmed to generate data dividing the target surface into a plurality of target positions wherein each target position that is to receive radiation receives a desired number of pulses.

68. The apparatus of claim 67 wherein the system is programmed to generate the desired number of pulses to be directed at each target position based on an amount of exposure to be achieved at each position.

69. The apparatus of claim 68 wherein the system is programmed to decrement the number of pulses to be directed substantially at each position.

70. The apparatus of claim 41 wherein the source of pulsed radiation is a pulsed laser.

71. The apparatus of claim 41 wherein the source of pulsed radiation is a modulated continuous output laser.

72. The apparatus of claim 42 wherein the system is programmed to generate locations of at least a portion of the plurality of predefined positions based on at least one feature of at least one lamina of the object.

73. The apparatus of claim 41 wherein the source of pulsed radiation comprises a beam of pulses having a time width separated by periods of no radiation.

74. The apparatus of claim 73 wherein the beam is configured to scan with a scanning velocity across the target surface, and is configured to move less than about 0.025 mm during the duration of a single pulse.

75. The apparatus of claim 73 wherein each pulse has a spatial beam width and the beam is configured to scan over the target surface with a predetermined velocity, and the beam is configured to move over the target surface less than about 10% of the spatial beam width during the duration of a single pulse.

76. The apparatus of claim 73 wherein the beam of pulses has an average duty cycle less than or equal to about 1%.

77. The apparatus of claim 76 wherein the average duty cycle is less than or equal to about 0.1%.

78. The apparatus of claim 42 wherein the system is programmed to generate the plurality of predefined positions defining at least one entire lamina.

79. The apparatus of claim 42 wherein the system is programmed to generate the plurality of predefined positions defining at least a portion of at least one of the laminae.

80. The apparatus of claim 41 additionally comprising a system programmed to generate data that causes the source of pulsed radiation to produce pulses at a first set of desired positions that result in at least some laterally joined regions of a solidified medium.

81. An apparatus for forming at least a portion of a three-dimensional object from a solidifiable medium, comprising:
a source of pulsed radiation capable of transforming the solidifiable medium at a target surface to form at least a portion of a lamina of the object;
at least one optical element located along an optical path between the source of pulsed radiation and the target surface and controlled to direct a beam of pulsed radiation to selected locations at the target surface;
an encoder functionally coupled to the at least one optical element for providing beam positioning data;
a trigger device functionally coupled to at least the encoder and the source of pulsed radiation, the trigger device used for comparing beam position data with desired pulsing position data and for causing the source to produce pulses of radiation so that pulsing occurs when the beam position data and pulsing position data are substantially correlated;
at least one computer functionally coupled to at least the trigger device, and capable of providing the trigger device with desired pulsing positions; and
a system programmed to generate data for a first set of desired pulsing positions at the target surface and at least a second set of desired pulsing positions at the target surface wherein the second set comprises positions substantially intermediate to positions of the first set.

82. The apparatus of claim 81 additionally comprising a system programmed to generate data indicating a plurality of predefined positions at the target surface at which the pulses are substantially directed.

83. The apparatus of claim 82 wherein the trigger device is configured to correlate at least some of the pulses during formation of a plurality of laminae.

84. The apparatus of claim 83 wherein the system is programmed to generate at least some positions on a first lamina that are offset from at least some positions on a second lamina.

85. The apparatus of claim 81 wherein the system is programmed to generate data that causes the source of pulsed radiation to produce pulses at the first set of desired positions that result in at least some laterally isolated regions of solidified medium and pulses at the second set of desired positions that result in solidified medium that laterally joins at least some of the solidified regions from the first set of desired positions.

86. The apparatus of claim 81 wherein the system is programmed to generate additional data comprising at least a third set of desired pulsing positions that result in solidified medium that joins at least some solidified medium resulting from the first and second sets of desired pulsing positions.

87. The apparatus of claim 82 wherein the system is programmed to generate data of predefined positions comprising a plurality of positions each having a desired spacing from an immediately adjacent position.

88. The apparatus of claim 87 wherein the system is programmed to generate data wherein the desired spacing is variable.

89. The apparatus of claim 81 wherein the at least one optical element comprises at least one computer controlled scanning mirror.

90. The apparatus of claim 89 wherein the at least one computer controlled scanning mirror comprises a rotatable scanning mirror that undergoes mirror rotation.

91. The apparatus of claim 90 wherein the trigger device is configured to correlate the mirror rotation and the issuance of pulse commands and is configured to cause pulses to be directed at selected locations on the target surface corresponding to encoder positions.

92. The apparatus of claim 89 wherein the at least one computer controlled scanning mirror comprises two substantially perpendicularly oriented and independently positionable scanning mirrors and the issuance of pulse commands is correlated to the positioning of both mirrors.

93. The apparatus of claim 92 wherein both scanning mirrors are rotatable scanning mirrors.

94. An apparatus for forming at least a portion of a three-dimensional object from a solidifiable medium, comprising:
a source of pulsed radiation capable of transforming the solidifiable medium at a target surface to form at least a portion of a lamina of the object;
at least one optical element located along an optical path between the source of pulsed radiation and the target surface and controlled to direct a beam of pulsed radiation to selected locations on the target surface;
an encoder functionally coupled to the at least one optical element for providing beam positioning data;
a trigger device functionally coupled to at least the source of pulsed radiation, the trigger device causing the source to produce pulses of radiation;
at least one computer functionally coupled to at least the trigger and the encoder, and capable of providing the trigger with a trigger signal so that pulsing occurs when the beam position data is substantially correlated to desired pulsing positions; and
a system programmed to generate data for a first set of desired pulsing positions at the target surface and at least a second set of desired pulsing positions at the target surface wherein the second set comprises positions substantially intermediate to positions of the first set.

95. The apparatus of claim 94 additionally comprising a system programmed to generate data indicating a plurality of predefined positions at the target surface at which the pulses are substantially directed.

96. The apparatus of claim 95 wherein the at least one computer is configured to correlate at least some of the pulses during formation of a plurality of laminae.

97. The apparatus of claim 96 wherein the system is programmed to generate at least some positions on a first lamina that are offset from at least some positions on a second lamina.

98. The apparatus of claim 94 wherein the system is programmed to generate data that causes the source of pulsed radiation to produce pulses at the first set of desired positions that result in at least some laterally isolated regions of solidified medium and pulses at the second set of desired positions that result in solidified medium that laterally joins at least some of the solidified regions from the first set of desired positions.

99. The apparatus of claim 94 wherein the system is programmed to generate additional data comprising at least a third set of desired pulsing positions that result in solidified medium that joins at least some solidified medium resulting from the first and second sets of desired pulsing positions.

100. The apparatus of claim 95 wherein the system is programmed to generate data of predefined positions comprising a plurality of positions each having a desired spacing from an immediately adjacent position.

101. The apparatus of claim 100 wherein the system is programmed to generate data wherein the desired spacing is variable.

102. The apparatus of claim 94 wherein the at least one optical element comprises at least one computer controlled scanning mirror.

103. The apparatus of claim 102 wherein the at least one computer controlled scanning mirror comprises a rotatable scanning mirror that undergoes mirror rotation.

104. The apparatus of claim 103 wherein the at least one computer is configured to correlate the mirror rotation and the issuance of pulse commands and together with the trigger device is configured to cause pulses to be directed at selected locations on the target surface corresponding to encoder positions.

105. The apparatus of claim 102 wherein the at least one computer controlled scanning mirror comprises two substantially perpendicularly oriented and independently positionable scanning mirrors and the issuance of pulse commands is correlated to the positioning of both mirrors.

106. The apparatus of claim 105 wherein both scanning mirrors are rotatable scanning mirrors.

* * * * *